UNITED STATES PATENT OFFICE 2,473,019

PRODUCTION OF FERROCHROMIUM

Hendrik de W. Erasmus, Lewiston, N. Y., assignor, by mesne assignments, to Union Carbide and Carbon Corporation, a corporation of New York No Drawing. Application April 13, 1948, Serial No. 20,851

4 Claims. (Cl. 75—28)

The invention relates to the production of ferrochromium, an alloy of iron and chromium in which the content of chromium preferably is within the range of 65% to 75% but may vary within the broader range of 50% to 90%.

In the production of many chromium-containing iron alloys it is highly desirable to employ ferrochromium having a low content of both carbon and sulfur. In the present state of the art ferrochromium of low-carbon, low-sulfur content is prepared by a silicon reduction process. The raw materials employed consist primarily of chromium ore, silicon or a silicon alloy, and fluxing agents. The manufacturing operation is conducted in the molten state, generally in an open-arc electric furnace. The reduction of the chromium ore proceeds in accordance with the following equation:

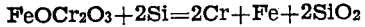

$$FeOCr_2O_3 + 2Si = 2Cr + Fe + 2SiO_2$$

In accordance with the present invention ferrochromium of low-carbon and low-sulfur content is prepared by reacting sulfur-containing, high-carbon ferrochromium with silica in the solid state. Although many oxidants may be employed with varying degrees of effectiveness to decarburize high-carbon ferrochromium, it has been found that to eliminate sulfur the amount of oxygen added as silica is preferably more than 10% of the combined oxygen of the oxidant. Among oxidants which may be employed with silica are metal oxides such as chromium oxide, iron oxide, and manganese oxide, or oxygen-bearing salts such as carbonates and the like.

In the production of low-carbon, low-sulfur ferrochromium according to the invention, high-carbon ferrochromium containing an undesirable amount of sulfur and the selected oxidant material are first comminuted to extreme fineness i. e. preferably below 30 microns particle size and then thoroughly mixed. The amount of oxidant should be equal to and preferably in slight excess of that required to supply the necessary oxygen to react with and remove as gas the desired amount of carbon from the high-carbon ferrochromium.

After mixing, the charge is preferably pelleted or otherwise converted into compressed lump form. Pelleting of the charge provides excellent contact between reacting particles and also the necessary interstitial space for the escape of reaction gases as well as a convenient form for handling the material. Bonding agents such as chromic acid and water may be advantageously employed in the formation of pellets.

The pellets may be charged into any suitable vacuum furnace and heated in vacuo or under reduced pressure until carbon and sulfur are eliminated to the desired extent. The preferred temperature range for heating the pellets lies above 1150° C. and below the temperature at which the reacting charge fuses, i. e. below about 1400° C.

The following specific example of the decarburization and desulfurization of high-carbon ferrochromium illustrates the principles and practice of the invention. 2120 parts of comminuted high-carbon ferrochromium having approximately the composition:

|  | Per cent |
| --- | --- |
| Chromium | 68.11 |
| Iron | 26.81 |
| Carbon | 4.72 |
| Sulfur | 0.12 |
| Silicon | 1.46 | and 276 parts of comminuted silica rock containing 99% silica were thoroughly mixed with 42 parts of chromic acid and 79 parts of water and compressed into oval shaped pellets approximately 1.25 inches long by 0.875 inch wide by 0.725 inch thick. The pellets were dried, charged into a furnace and heated at a temperature between 1250° C. and 1300° C. at a pressure of about 2 millimeters of mercury absolute for about 25 hours. The final product had the approximate composition:

|  | Per cent |
| --- | --- |
| Chromium | 66.89 |
| Iron | 25.54 |
| Carbon | 0.01 |
| Sulfur | 0.009 |
| Silicon | 6.20 |
| Silica | 1.12 |

What is claimed is:

1. Method of decarburizing and desulfurizing ferrochromium containing carbon and sulfur which comprises mixing comminuted ferrochromium and a comminuted oxidant at least 10% of the combined oxygen of said oxidant being supplied as silica, the quantity of said oxidant being in excess of that required to supply oxygen sufficient to combine with the carbon to be eliminated from said ferrochromium; and heating said mixture under sub-atmospheric pressure at a temperature sufficient to promote reaction but below the fusion point of any part of the charge.

2. Method as claimed in claim 1 wherein the temperature of the heating step is above 1150° C.

3. Method as claimed in claim 1 in which at least 10% of the combined oxygen of said oxidant is supplied as silica, the remainder of the combined oxygen being supplied as oxides of chromium and iron.

4. Method as claimed in claim 1 in which said mixture of comminuted ferrochromium and comminuted oxidant is pelleted prior to said heating step.

HENDRIK DE W. ERASMUS.

REFERENCES CITED

The following references are of record in the file of this patent:

UNITED STATES PATENTS

| Number | Name | Date |
|---|---|---|
| Re. 21,500 | Rennerfelt | July 2, 1940 |